United States Patent [19]
Gaignard et al.

[11] Patent Number: 5,683,215
[45] Date of Patent: Nov. 4, 1997

[54] DEVICE FOR FASTENING AN ELEMENT TO ANOTHER ELEMENT SUCH AS THE BODYWORK OF A MOTOR VEHICLE

[75] Inventors: Bruno Gaignard, Chatellerault; Rémy Monmaneix, Acon; Jean-Louis Roumegoux, Paris, all of France

[73] Assignee: Valeo Systemes d'Essuyage, La Verriere, France

[21] Appl. No.: 564,413

[22] Filed: Nov. 29, 1995

[30] Foreign Application Priority Data

Nov. 30, 1994 [FR] France .................. 94 14493

[51] Int. Cl.$^6$ .................. F16B 13/04; F16B 13/06
[52] U.S. Cl. .................. 411/34; 411/55
[58] Field of Search .................. 411/34, 36, 37, 411/38, 55, 222

[56] References Cited

U.S. PATENT DOCUMENTS

| | | | |
|---|---|---|---|
| 2,277,885 | 3/1942 | Rodanet | 411/34 |
| 2,365,372 | 12/1944 | Allen | 411/34 |
| 3,013,643 | 12/1961 | Perry . | |
| 3,014,563 | 12/1961 | Bratton | 411/34 |
| 3,489,312 | 1/1970 | Hunckler et al. . | |
| 3,675,881 | 7/1972 | Caldwell . | |
| 3,719,119 | 3/1973 | Straub | 411/34 |
| 3,929,250 | 12/1975 | Abbate et al. | 411/55 |
| 4,108,043 | 8/1978 | Varga | 411/34 |
| 4,619,568 | 10/1986 | Cartensen | 411/222 |
| 5,253,962 | 10/1993 | Close, Jr. | 411/53 |

FOREIGN PATENT DOCUMENTS

| | | | |
|---|---|---|---|
| 207543 | 2/1960 | Austria | 411/34 |
| 510011 | 2/1955 | Canada | 411/34 |
| 1368673 | 2/1964 | France . | |

OTHER PUBLICATIONS

French Search Report dated 12 Jul., 1995.

*Primary Examiner*—Steven N. Meyers
*Assistant Examiner*—Robert G. Santos
*Attorney, Agent, or Firm*—Morgan & Finnegan, LLP

[57] ABSTRACT

A fastening device for fastening a first element to a second element, for example for mounting a component of a motor vehicle screen wiping apparatus on a panel of the bodywork of the vehicle, is of the general kind comprising a bolt and nut assembly, with the shank of the bolt passing through a hole in the panel. A shock absorbing bush, e.g. of rubber, is interposed between the bolt and nut assembly and the hole. When the device is tightened, this bush is compressed axially between an annular and radial thrust surface carried by the bolt and the annular gripping face of the nut. A gripping spacer element is disposed axially between the radial thrust surface and the annular gripping face of the nut.

11 Claims, 6 Drawing Sheets

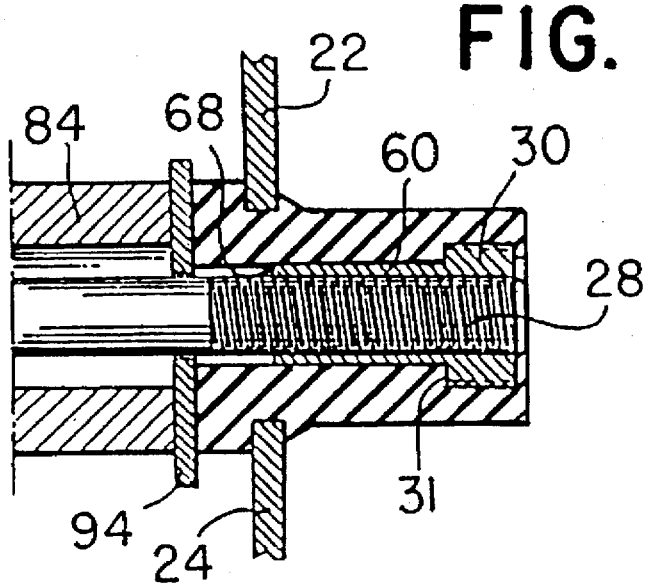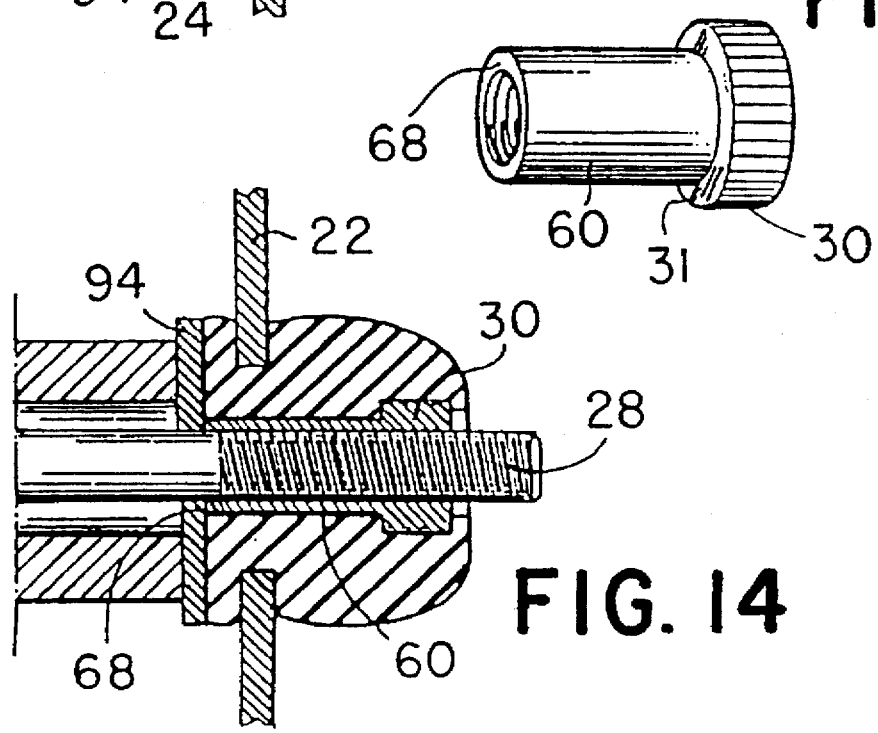

DEVICE FOR FASTENING AN ELEMENT TO ANOTHER ELEMENT SUCH AS THE BODYWORK OF A MOTOR VEHICLE

FIELD OF THE INVENTION

The present invention relates to a device for fastening a first element to a second element having a hole formed through it. In particular, though not exclusively, the invention relates to such a fastening device for mounting an element which is part of a screen wiping mechanism, such as a support plate of the mechanism, to the bodywork of the vehicle.

More especially, the invention relates to such a fastening device of the type comprising an assembly of a nut with an elongate fastener such as a screw or bolt, the shank of which extends through the hole in the second element, which typically consists of a sheet metal element, with a shock absorbing bush being interposed so as to be compressed axially, when the device has been tightened, between an annular radial thrust surface formed on the body of the shank of the fastener, and an annular gripping face of the nut.

BACKGROUND OF THE INVENTION

In an arrangement which is in most common use at the present time, the shock absorbing bush is a tubular cylindrical sleeve which, during the tightening operation, is compressed axially by the corresponding annular surface of the threaded fastener or bolt, and that of the nut, which compress it in such a way as to enlarge its diameter at the level of the hole in the second element (or carrier plate), and in such a way as to grip the opposed faces of the carrier plate axially between the opposed, deformed, portions of the tubular sleeve. The fastening device, and the first element carried by it, are thus secured elastically to the second element.

These known arrangements do not permit the configuration of the shock absorbing bush to be precisely controlled when the fastening device is tightened. The resulting inability to obtain precise control of the gripping force can lead either to an excessive gripping force, which prevents the shock absorbing bush (which is typically of an elastomeric material or rubber) from fulfilling its proper purpose as a damping element, or to an insufficient gripping force, which results in the first element being positioned with insufficient precision with respect to the second element, typically the vehicle bodywork.

DISCUSSION OF THE INVENTION

An object of the present invention is to provide a novel design for a fastening device of the general kind referred to above, which will overcome these drawbacks.

To this end, the invention proposes a fastening device characterised in that a gripping spacer is disposed so as to extend axially between the radial thrust surface and the annular gripping face of the nut.

The spacer preferably comprises a sleeve coaxial with the bush. This sleeve is preferably disposed inside the bush.

The radial thrust surface is preferably defined on a flat annular collar element which bears against a radial shoulder of the fastener. This collar element may be made in one piece with the sleeve; alternatively, the sleeve may bear axially against the said radial thrust surface of the collar element.

In some embodiments of the invention, a gripping ring is interposed between the annular gripping surface of the nut and the shock absorbing bush.

According to a preferred feature of the invention, that surface of the gripping ring, if provided, which faces towards the shock absorbing bush has a chamfered profiled element such as a bead, standing proud of the surface: this profiled element serves to guide the deformation of the shock absorbing bush while the fastening device is being tightened.

In the tightened condition of the fastening device where it includes a gripping ring, the spacer preferably bears axially against a portion, in facing relationship with it, of the gripping ring.

The invention accordingly provides a device for fastening a first element, for example an element which is part of a screen wiper mechanism, to a second element, for example the bodywork of a motor vehicle. The device is of the type comprising an assembly of a nut with an elongate fastener, such as a screw or bolt, the shank of which extends through a hole formed in a plate or panel of the second element, with a shock absorbing bush being interposed, the bush being, in the tightened condition of the device, compressed axially between an annular radial thrust surface, formed on the body of the said shank, and an annular gripping face of the nut. A gripping ring is interposed between the annular gripping face of the nut and the shock absorbing bush, with a gripping spacer being interposed axially between the radial thrust surface and the gripping ring, characterised in that the surface of the gripping ring that faces towards the shock absorbing bush and away from the nut has a chamfered projecting profile which guides the axial deformation of the shock absorbing bush during axial tightening of the device.

In the free or fully untightened condition of the fastening device, the outer diameters of the nut and shock absorbing bush may be smaller than the diameter of the hole in the sheet metal element which is to carry the fastening device. The outer diameter of the gripping ring, if provided, also may be smaller than the diameter of the hole.

The sleeve may be made integrally, i.e. in one piece, with the nut. The nut may be embedded within the shock absorbing bush.

Further features and advantages of the invention will appear more clearly on a reading of the following detailed description of various preferred embodiments of the invention, given by way of example and with reference to the accompanying drawings.

BRIEF DESCRIPTION OF THE DRAWINGS

FIG. 13 is a view similar to FIG. 10, but shows a further modified embodiment of the invention in which the spacer is made integrally with the tightening nut, the latter being embedded in the shock absorbing bush.

FIG. 14 shows the device of FIG. 13 in its tightened condition.

FIG. 15 is a perspective view, on an enlarged scale, of the nut when the latter is made in one piece with its spacer.

DESCRIPTION OF PREFERRED EMBODIMENTS OF THE INVENTION

Figure 1:
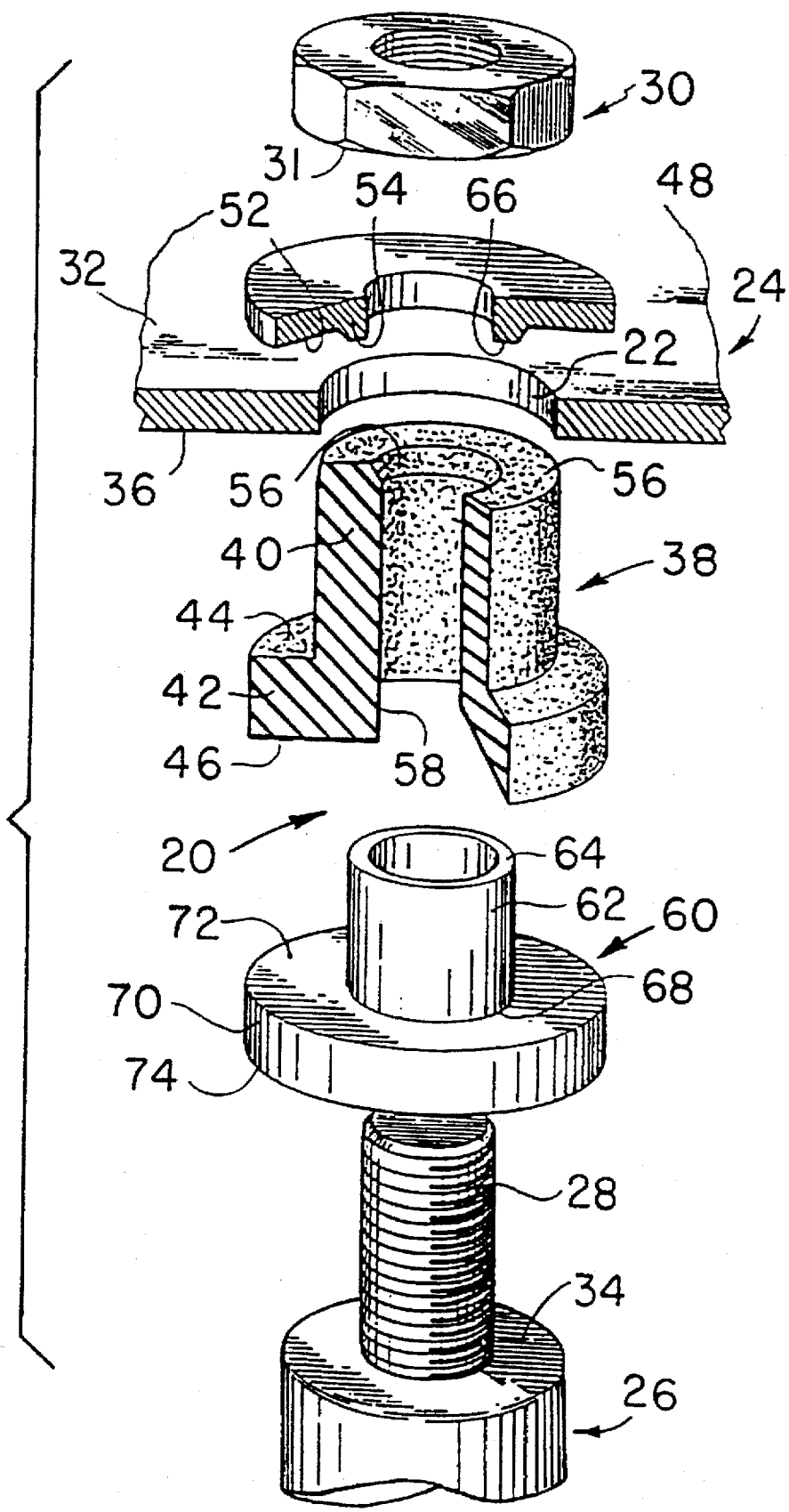
FIG. 1 is an exploded perspective view of the main components of a fastening device in a first embodiment in accordance with the invention, with some of these components being shown partly cut away.

In the following description, the same reference numerals are used to designate those parts that are identical or similar to each other throughout the description.

Figure 2:
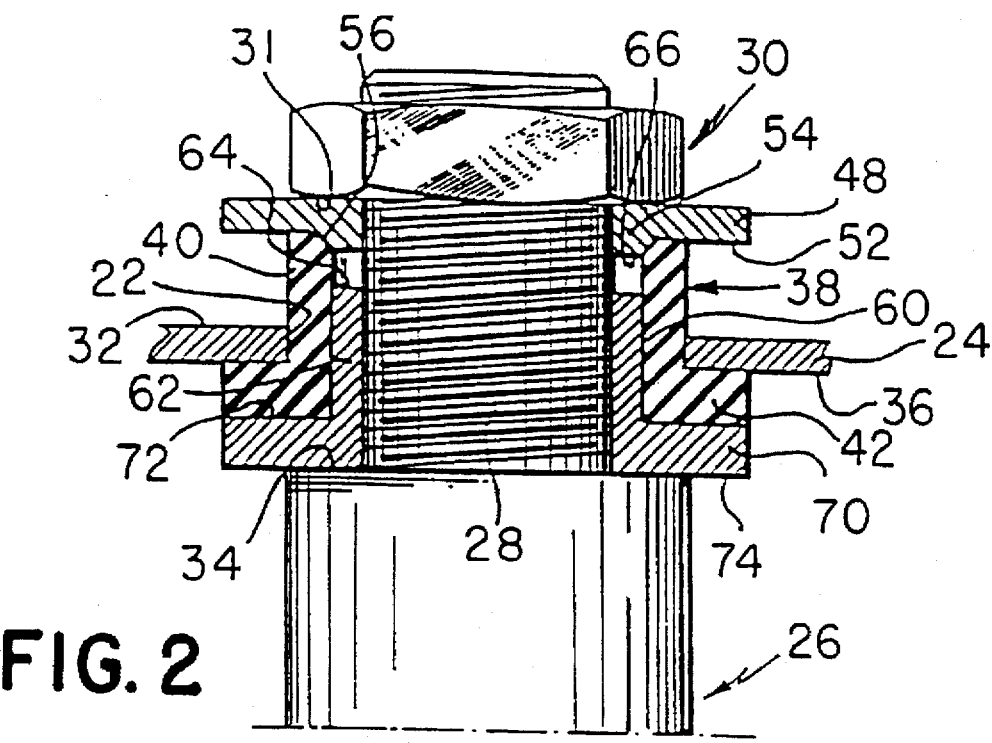
FIG. 2 is a view showing the same components as in FIG. 1, assembled but not tightened together.
Figure 3:
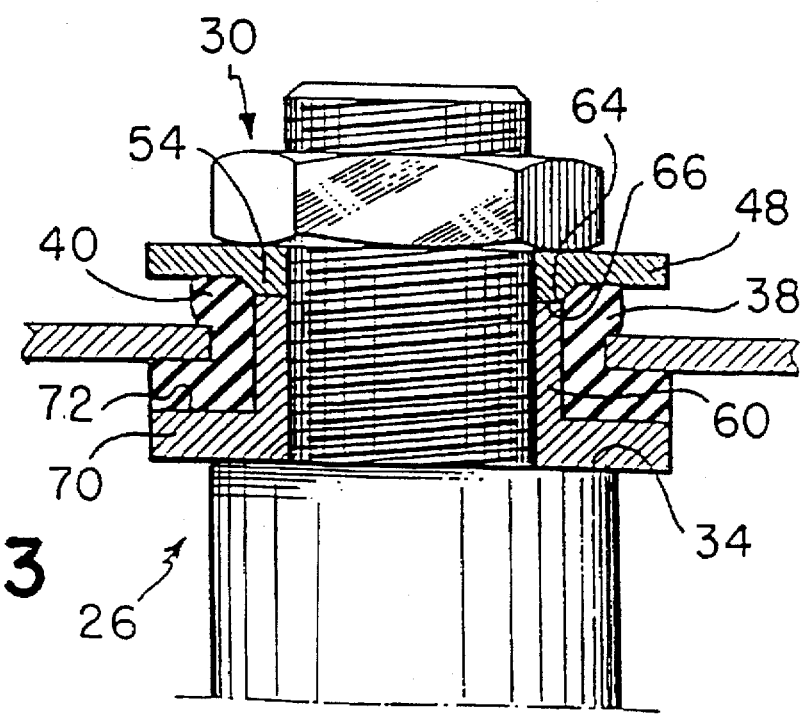
FIG. 3 is a view similar to FIG. 2, but here the components of the device are shown tightened together.

Reference is first made to FIGS. 1 to 3, which show a fastening device 20, the purpose of which is, in particular, to fasten elastically a first element (not shown) in a circular hole 22 formed in a second element, here in the form of a sheet metal component, or carrier plate, 24. The first element that is to be fastened to the carrier plate 24 is for example connected to the body 26 of a threaded fastener having a threaded shank 28, the latter being adapted to extend through the hole 22 and to cooperate with a hexagonal tightening nut 30.

The nut 30 lies above the upper face 32 of the carrier plate 24, while the threaded shank 28 and body 26 of the fastener together define a radial annular thrust shoulder 34 which faces towards the lower face 36 of the carrier plate 24.

A shock absorbing bush 38, which is made of an elastomeric material or rubber, is interposed between the threaded shank 28 and the hole 22. The bush 38 consists of an annular cylindrical skirt portion 40 and a radial collar portion 42, the upper face 44 of which is arranged to engage against the lower face 36 of the carrier plate 24. The lower face 46 of the collar portion 42 faces towards the thrust or radial shoulder 34 of the fastener 26, 28.

A gripping ring 48 is interposed between the annular lower gripping face 31 of the nut 30 and the radial and annular end face 50 of the skirt portion 40 of the shock absorbing bush 38. The lower face 52 of the gripping ring 48 has a projecting profiled element, here in the form of a bead 54, which is chamfered so as to cooperate with a corresponding chamfer 56 formed in the vicinity of the free upper end of the internal cylindrical hole, or bore, 58 of the shock absorbing bush 38.

An axial gripping spacer, or sleeve member, 60 is interposed between the radial shoulder 34 and the annular gripping face 31 of the nut 30, inside the bush 38. The sleeve member 60 comprises a body 62 in the form of a cylindrical tubular sleeve portion, the annular upper radial edge 64 of which is arranged to cooperate with the annular lower face 66 of the bead 54 of the gripping ring.

The sleeve member 60 is extended at the lower end 68 of the body or sleeve portion 62 by an external radial collar portion 70, the annular upper face 72 of which is arranged to cooperate with the annular lower face 46 of the shock absorbing bush 38. The annular lower face 74 of the collar portion 70 is arranged to cooperate with the radial shoulder 34 of the fastener 26, 28.

The outer diameter of the skirt portion 40 of the shock absorbing bush 38 is, before the components of the fastening device 20 are tightened up, and as is shown in FIG. 2, slightly smaller than the diameter of the hole 22, so that the fastener 26, 28, carrying the spacer 60 and the shock absorbing bush 38, can be inserted vertically upwards through the hole 22. Assembly of the device is continued by fitting the gripping ring 48 and the nut 30 on to the free end of the threaded shank 28 of the fastener.

In the operation of tightening up the fastening device, the nut 30 is rotated, thus causing progressive displacement of its annular lower gripping face 31 and of the gripping ring 48, axially downwards with reference to FIG. 2. This displacement causes the shock absorbing bush 38 to undergo progressive axial compression, in which its cylindrical skirt portion 40 deforms so as partly to overlap the upper face 32 of the carrier plate 24.

The fully tightened configuration of the fastening device 20 is determined by the annular radial end face 64 of the spacer 60 coming into abutment against the annular lower face 66 of the chamfered bead 54 of the gripping ring 48, as is shown in FIG. 3. This makes it impossible to tighten the assembly axially beyond this position. Accordingly, the degree of axial compression in the shock absorbing bush 38 is perfectly controlled.

Figure 4:
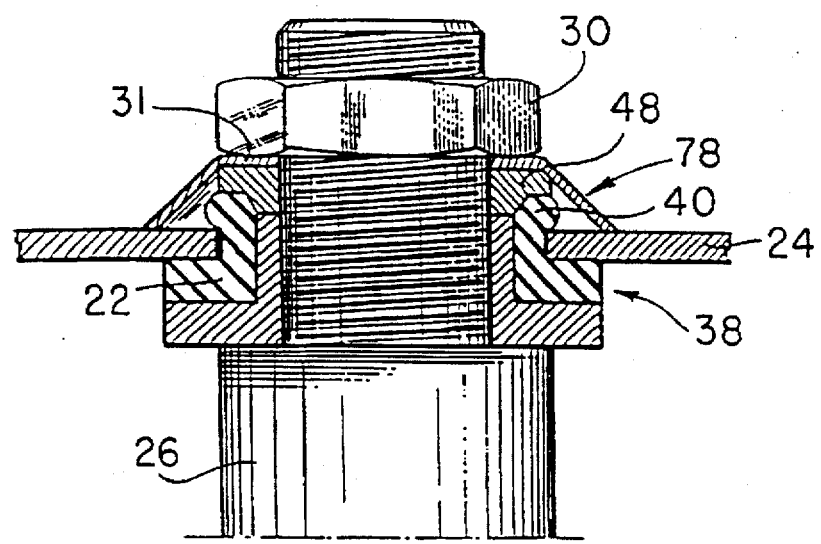
FIG. 4 is a view similar to FIG. 3, but shows a modified embodiment which includes a protective shroud for the shock absorbing bush.

Reference is now made to FIG. 4, which shows a first modified embodiment of the fastening device in accordance with the invention. In FIG. 4, a shroud 78, for protecting the compressed upper portion of the cylindrical skirt portion 40 of the shock absorbing bush 38, is interposed between the gripping ring 48 and the annular lower gripping face 31 of the nut 30.

In the embodiments described above with reference to FIGS. 1 to 4, the nut 30 is a conventional hexagonal nut. However, in the modified embodiment shown in FIGS. 5 and 6, to which reference is now made, the nut 30 is a cylindrical nut of the bayonet type, having a pin 80 which is received in a helical groove 82 formed in the shank 28 of the body 26 of the fastener.

Figures 5, 6:
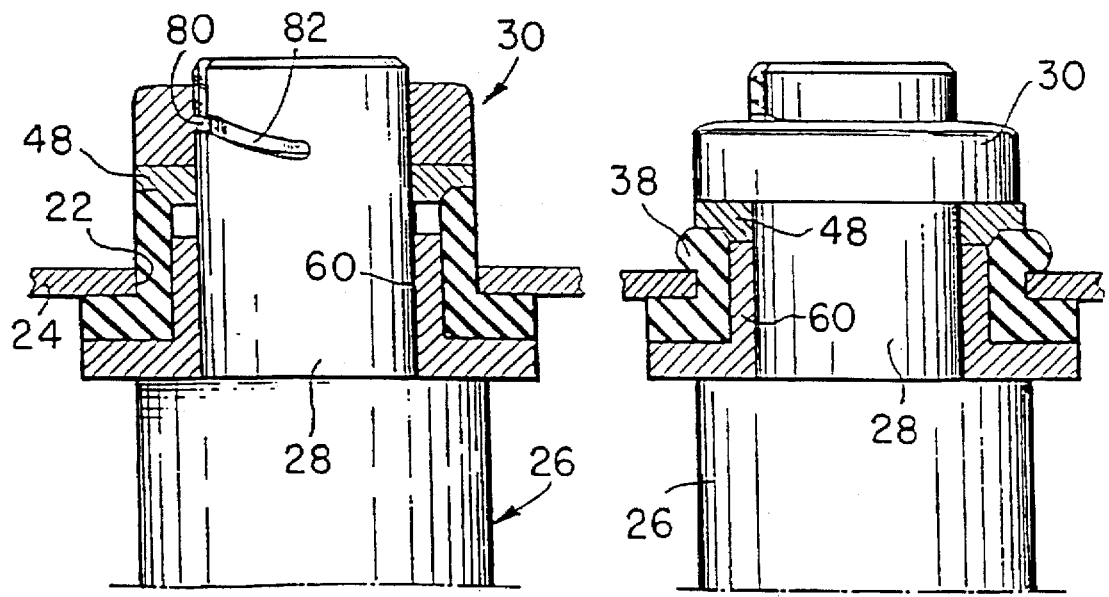
FIG. 5 is a view similar to FIG. 2, but shows a modified embodiment of the nut for effecting axial tightening of the fastening device.
FIG. 6 is a view similar to FIG. 5, but here the components of the device are shown tightened together.

The outer diameter of the cylindrical nut 30, and the outer diameter of the gripping ring 48, are smaller than the internal diameter of the hole 22 in the carrier plate 24. This enables the assembled components of the fastening device to be inserted upwardly (with reference to FIG. 5) into the hole 22. The operator then only has to tighten the nut 30 by rotating it so as to secure the assembly together with controlled axial compression of the shock absorbing bush 38, as shown in FIG. 6.

Figure 7:
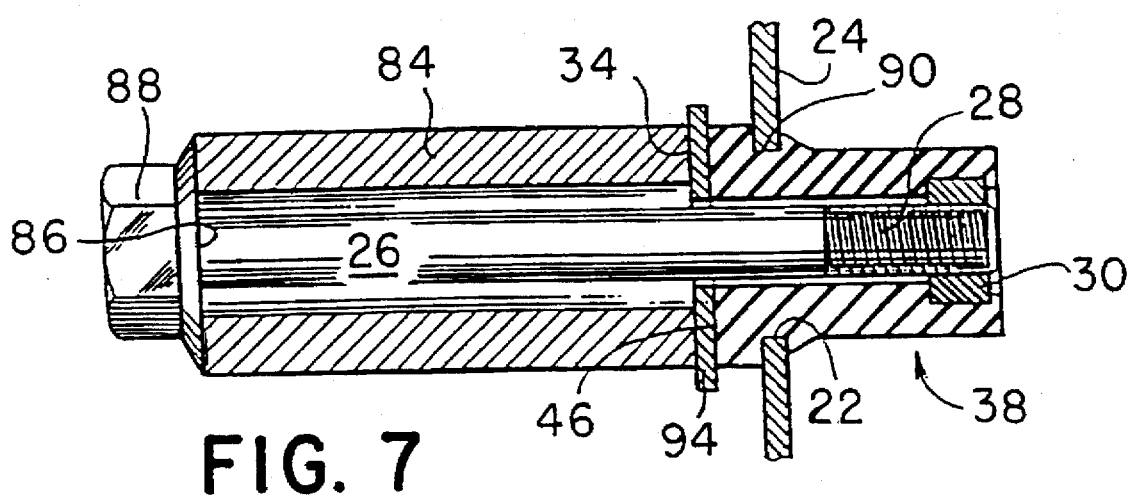
FIG. 7 is a view in axial cross section of another fastening device, this time according to the present state of the art, the latter being shown in a condition in which it is not tightened.
Figure 8:
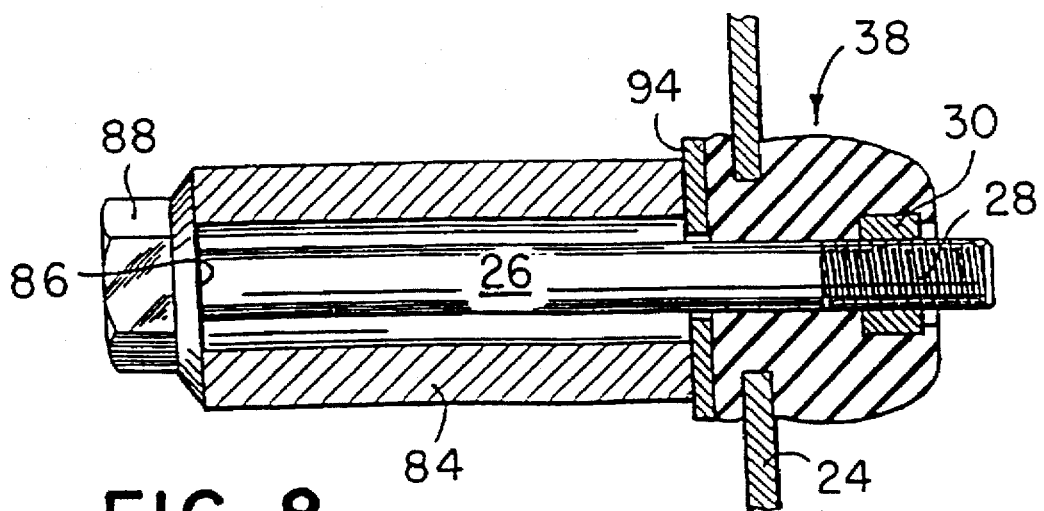
FIG. 8 is a view similar to FIG. 7, but with the device in a tightened condition.

Reference is now made to FIGS. 7 and 8, which show a fastening device in accordance with the present state of the art. One way in which this device differs from the arrangements according to the invention and described above is that the shoulder 34 is not formed directly on the body 26 of the threaded fastener, which is a bolt in this example, the body 26 of which is terminated by its threaded shank. Instead, the shoulder 34 is formed on a thrust sleeve 84 which bears against the annular face 86 of the hexagonal bead 88 of the bolt.

The shock absorbing bush 38 has a groove 90, the dimensions of which correspond to those of the hole 22 in the carrier plate 24. The bush 38 has a chamfered portion 92 which facilitates the forcible introduction of the carrier plate 24 into the groove 90.

The nut 30 is here embedded within the shock absorbing bush 38, and tightening is effected by screwing the bolt 26, 28, 88 into the nut. This, as can be seen in FIG. 8, causes the nut 30 to become displaced axially towards the radial abutment surface 34, so causing the bush 38 to become compressed.

A ring 94 may be interposed between the radial abutment surface 34 of the sleeve 84 and the annular end face 46 of the bush 38, in order to increase the engagement and gripping surface area.

Figure 9:
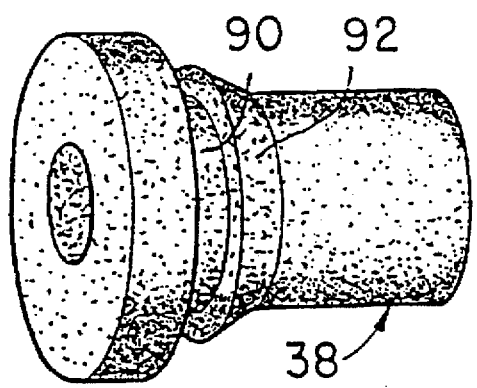
FIG. 9 is a perspective view of the shock absorbing bush which is part of the prior art fastening device shown in FIGS. 7 and 8.
Figure 10:
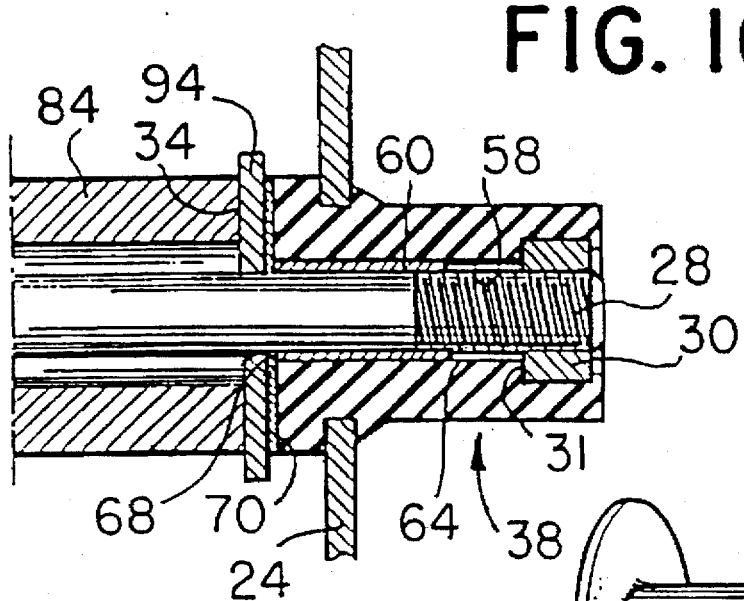
FIG. 10 is a view similar to FIG. 8, but shows the prior art device of FIG. 8 modified in accordance with features of the invention so as to incorporate an axial gripping spacer.
Figure 11:
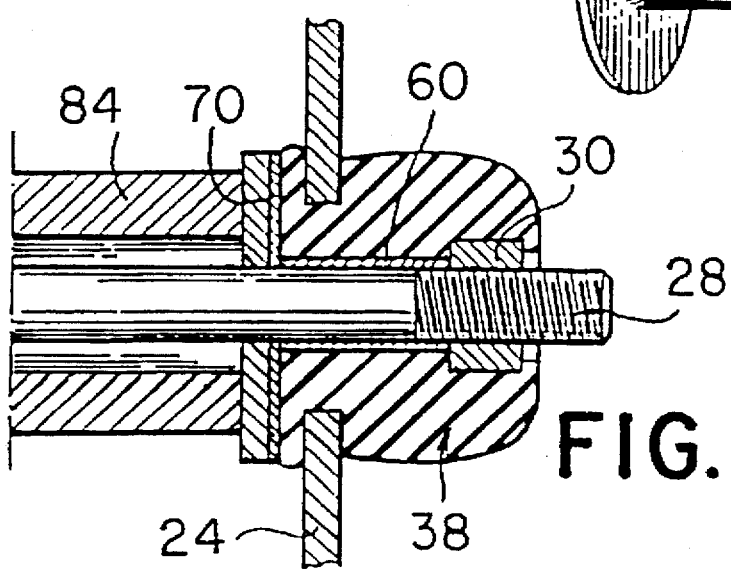
FIG. 11 shows the device of FIG. 10 in its tightened condition.

Reference is now made to FIGS. 10 and 11, which show a modification of the prior art arrangement shown in FIGS. 7 to 9, in a further embodiment of the present invention. In FIGS. 10 and 11, an axial gripping spacer comprising a sleeve 60 is arranged within the cylindrical bore 58 of the shock absorbing bush 38. The inner end 68 of the sleeve 60 bears against a collar member 70, here in the form of a separate washer, which is interposed between the ring 94 and the radial abutment surface 34 of the sleeve 84. The annular outer terminal edge 64 of the sleeve 60 is arranged to cooperate with the annular radial gripping face 31 of the embedded nut 30.

In the tightened condition of the fastener shown in FIG. 11, the fact that the nut 30 comes into abutment against the spacer sleeve 60 enables the axial compressive force of the shock absorbing bush 38 to be perfectly controlled.

Figure 12:
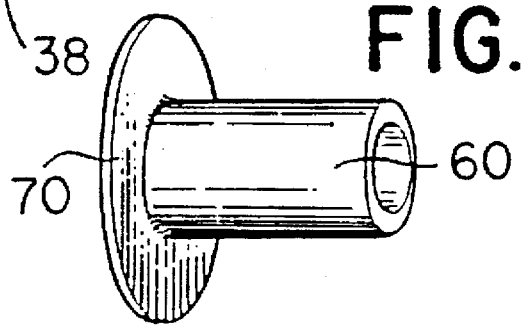
FIG. 12 is a perspective view on a larger scale, showing one modified version of the spacer incorporated in the fastening device seen in FIGS. 10 and 11, with the spacer in FIG. 12 being made integrally with a thrust collar.

Referring now to FIG. 12, in this further modified embodiment the tubular sleeve 60 is made integrally with the collar member 70.

Reference is now made to FIGS. 13 to 15, in which the spacer, in the form of the tubular sleeve 60, is made integrally with the embedded nut 30. The sleeve portion 60 of this combined member extends from the annular radial gripping face 31 of the nut and towards the ring 94. On completion of the tightening operation, the annular radial end face 68 of the spacer comprising the sleeve 60 comes into abutment against the surface, in facing relationship with it, of the ring 94, as is shown in FIG. 14.

The present invention may be applied, without limitation, to the fastening of an element which is part of a screen wiper mechanism on to the bodywork of a motor vehicle.

What is claimed is:

1. A selectively tightened and untightened fastening device, for fastening a first element to a second element having a hole formed through it, comprising: a fastener for carrying the first element and having a body defining a shank for extending through the hole, with means coaxial with said shank for defining an annular and radial thrust surface; a nut engaged on said shank, said nut having an annular gripping face for axially compressing the fastening device; an axially compressible and deformable shock absorbing bush interposed between said thrust surface and said gripping face for axial compression between said thrust and gripping faces when the device is tightened; a gripping ring interposed between said gripping face of said nut and said shock absorbing bush, and having a face oriented towards said shock absorbing bush; and an axial gripping spacer member disposed axially between said thrust surface and said gripping ring, at least a portion of said spacer member being within said bush to control the compression thereof, a chamfered element on said shock absorbing bush face of said gripping ring for guiding said deformation of said bush as said bush is compressed when the device is tightened.

2. A device according to claim 1, wherein said gripping ring has a portion facing towards said spacer member, whereby said spacer member abuts axially against said facing portion of the gripping ring when the device is tightened.

3. A device according to claim 1, wherein said spacer member further comprises a sleeve coaxial with said shock absorbing bush.

4. A device according to claim 3, wherein said sleeve is disposed inside said shock absorbing bush.

5. A device according to claim 3, wherein said body has a radial shoulder defining said thrust surface, an annular collar element between said sleeve and said shoulder, said collar element bearing on said shoulder.

6. A device according to claim 5, wherein said collar element is integral with the sleeve.

7. A device according to claim 5, wherein said collar element has a radial thrust surface, said sleeve abutting axially against said radial thrust surface of said collar element.

8. In combination with a first element and a second element having a hole through it, a selectively tightened and untightened fastening device comprising: a fastener carrying the first element and having a body defining a shank extending through the hole, with means coaxial with said shank for defining an annular and radial thrust surface; a nut engaged on said shank, said nut having an annular gripping face for axially compressing the fastening device; an axially compressible and deformable shock absorbing bush interposed between said thrust surface and said gripping face for axial compression between said thrust and gripping faces when the device is tightened; a gripping ring interposed between said gripping face of said nut and said shock absorbing bush, and having a face oriented towards said shock absorbing bush; and an axial gripping spacer member disposed axially between said thrust surface and said gripping ring, at least a portion of said spacer member being within said bush to control the compression thereof, a chamfered element on said shock absorbing bush face of said gripping ring for guiding said deformation of said bush as said bush is compressed when the device is tightened, wherein the outer dimensions of the nut and the untightened bush are smaller than the corresponding dimensions of the second element hole.

9. A device according to claim 8, wherein the outer dimension of the gripping ring is smaller than the corresponding dimension of the second element hole.

10. A device according to claim 4, wherein said sleeve is integral with said nut.

11. A device according to claim 10, wherein said nut is embedded in said shock absorbing bush.

* * * * *